(12) United States Patent
Minakuchi

(10) Patent No.: US 9,204,010 B2
(45) Date of Patent: Dec. 1, 2015

(54) IMAGE FORMING APPARATUS AND IMAGE FORMING METHOD

(71) Applicant: KYOCERA Document Solutions Inc., Osaka (JP)

(72) Inventor: Koji Minakuchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/064,013

(22) Filed: Oct. 25, 2013

(65) Prior Publication Data

US 2014/0118753 A1    May 1, 2014

(30) Foreign Application Priority Data

Oct. 31, 2012 (JP) ................................. 2012-241312

(51) Int. Cl.
*G06K 15/00* (2006.01)
*G06F 3/12* (2006.01)
*H04N 1/393* (2006.01)
*H04N 1/387* (2006.01)

(52) U.S. Cl.
CPC ............. *H04N 1/393* (2013.01); *H04N 1/3875* (2013.01)

(58) Field of Classification Search
USPC ........................................................ 399/81
See application file for complete search history.

(56) References Cited

U.S. PATENT DOCUMENTS

| 5,839,019 | A | * | 11/1998 | Ito .................................... 399/45 |
| 7,808,663 | B2 | | 10/2010 | Teranishi et al. |
| 7,999,968 | B2 | | 8/2011 | Teranishi et al. |
| 2010/0196041 | A1 | * | 8/2010 | Otaki .............................. 399/81 |

FOREIGN PATENT DOCUMENTS

| JP | 09-102863 | A |   | 4/1997 |
| JP | 10-210281 | A |   | 8/1998 |
| JP | 2001-189853 | A |   | 7/2001 |
| JP | 2001189853 | A | * | 7/2001 |
| JP | 2005-209087 | A |   | 8/2005 |
| JP | 2005209087 | A | * | 8/2005 |

OTHER PUBLICATIONS

Notice of Rejection mailed by Japan Patent Office on Sep. 9, 2014 in the corresponding Japanese patent application No. 2012-241312—4 pages.

* cited by examiner

*Primary Examiner* — Huo Long Chen
(74) *Attorney, Agent, or Firm* — Knobbe, Marten Olson & Bear LLP

(57) ABSTRACT

An image forming apparatus includes a document reading section, a recording medium size selecting section, a large-size document identifying section, and an image forming area setting section. The recording medium size selecting section is configured to select a size of recording media for use in forming images from image data sets of original documents. The large-size document identifying section is configured to identify an image data set greater in document size than a predetermined document size. The image forming area setting section is configured to, for the image data set of greater document size, set an entire imagable area of a recording medium to an image forming area and, for the image data set of the predetermined document size, set one half of the imagable area of a recording medium to an image forming area in a layout for booklet printing.

4 Claims, 11 Drawing Sheets

(ORIGINAL DOCUMENTS)

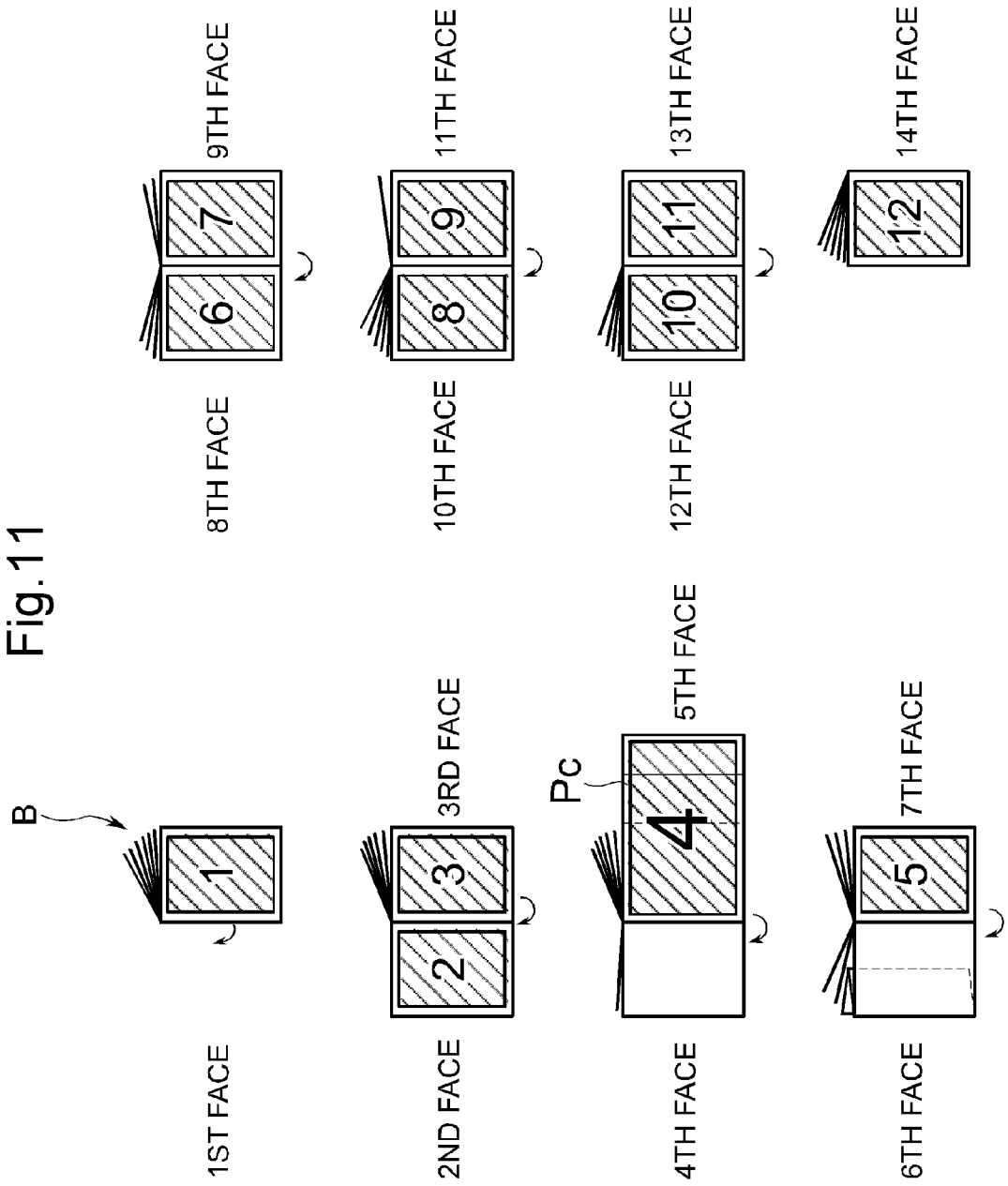

IMAGE FORMING APPARATUS AND IMAGE FORMING METHOD

INCORPORATION BY REFERENCE

This application claims priority to Japanese Patent Application No. 2012-241312 filed on Oct. 31, 2012, the entire contents of which are incorporated by reference herein.

BACKGROUND

The present disclosure relates to image forming apparatuses and image forming methods and particularly relates to a booklet printing technique.

Various image forming apparatuses with a booklet printing function have been proposed in the past. The booklet printing refers to a technique of reading one side or both sides of each of a plurality of original documents and producing prints in which a set of images formed from the read original documents are arranged on both sides of recording paper sheets of a size equal to two original documents laid side by side, with four pages per recording paper sheet, to match the page order of the original documents during reading with the page order of the resultant prints laid one on another in booklet form. The recording paper sheets thus printed in booklet page order are discharged as a booklet in which a stack of them has been center-folded by a post-processing unit.

As an image forming apparatus capable of performing booklet printing, an image forming apparatus is known in which when, during printing for original documents of mixed document sizes, the size of an image data set generated from one of the read original documents is greater than an image forming area of a recording paper sheet, the scale of the image data set is changed by calculating an appropriate reduction ratio to fit the image data set in the image forming area, which is one half of a printable area of one side of the recording paper sheet.

In another known image forming apparatus, when the size of an image data set of a read original document is greater than an image forming area, the image data set is divided into right and left halves and the divided halves are allocated on recording paper sheets to form a pair of facing pages in a finished booklet.

SUMMARY

A technique improved over the aforementioned techniques is proposed as one aspect of the present disclosure.

An image forming apparatus according to an aspect of the present disclosure includes a document reading section, a document size detecting section, a recording medium size selecting section, an image forming section, a large-size document identifying section, an image forming area setting section, and a control section.

The document reading section is configured to read a plurality of original documents of mixed document sizes to generate respective image data sets of the original documents.

The document size detecting section is configured to detect respective document sizes of the original documents to be read by the document reading section.

The recording medium size selecting section is configured to, based on the document sizes detected by the document size detecting section, select a size of recording media for booklet printing and for use in forming images from the image data sets of the original documents.

The image forming section is configured to form, on the recording media of the size selected by the recording medium size selecting section, images from the image data sets of the original documents generated by the document reading section.

The large-size document identifying section is configured to identify, from among the image data sets of the plurality of original documents generated by the document reading section, an image data set of an original document whose document size detected by the document size detecting section is greater than a predetermined document size.

The image forming area setting section is configured to, for the image data set of the original document whose document size is greater than the predetermined document size out of the image data sets of the plurality of original documents, set an entire imagable area of one side of a recording medium of the selected size to an image forming area and, for the image data set of the original document whose document size is the same as the predetermined document size out of the image data sets of the plurality of original documents, set one half of the imagable area of one side of a recording medium of the selected size to an image forming area in a layout for the booklet printing.

The control section is configured to allow the image forming section to form images from the image data sets of the original documents on the image forming areas of the recording media of the selected size set by the image forming area setting section.

An image forming method according to another aspect of the present disclosure includes a document reading step, a document size detecting step, a recording medium size selecting step, a large-size document identifying step, an image forming area setting step, and an image forming step.

The document reading step is the step of reading a plurality of original documents of mixed document sizes to generate respective image data sets of the original documents.

The document size detecting step is the step of detecting respective document sizes of the original documents to be read in the document reading step.

The recording medium size selecting step is the step of, based on the document sizes detected in the document size detecting step, selecting a size of recording media for booklet printing and for use in forming images from the image data sets of the original documents.

The large-size document identifying step is the step of identifying, from among the image data sets of the plurality of original documents generated in the document reading step, an image data set of an original document whose document size detected in the document size detecting step is greater than a predetermined document size.

The image forming area setting step is the step of, for the image data set of the original document whose document size is greater than the predetermined document size, setting an entire imagable area of one side of a recording medium of the selected size to an image forming area and, for the image data set of the original document whose document size is the same as the predetermined document size, setting one half of the imagable area of one side of a recording medium of the selected size to an image forming area in a layout for the booklet printing.

The image forming step is the step of forming images from the image data sets of the original documents generated in the document reading step on the image forming areas of the recording media of the size selected in the recording medium size selecting step, the image forming areas being set in the image forming area setting step.

BRIEF DESCRIPTION OF THE DRAWINGS

FIG. 11 is diagram showing a page order of a booklet formed of the printed matter B bound by stapling.

DETAILED DESCRIPTION

Figure 1:
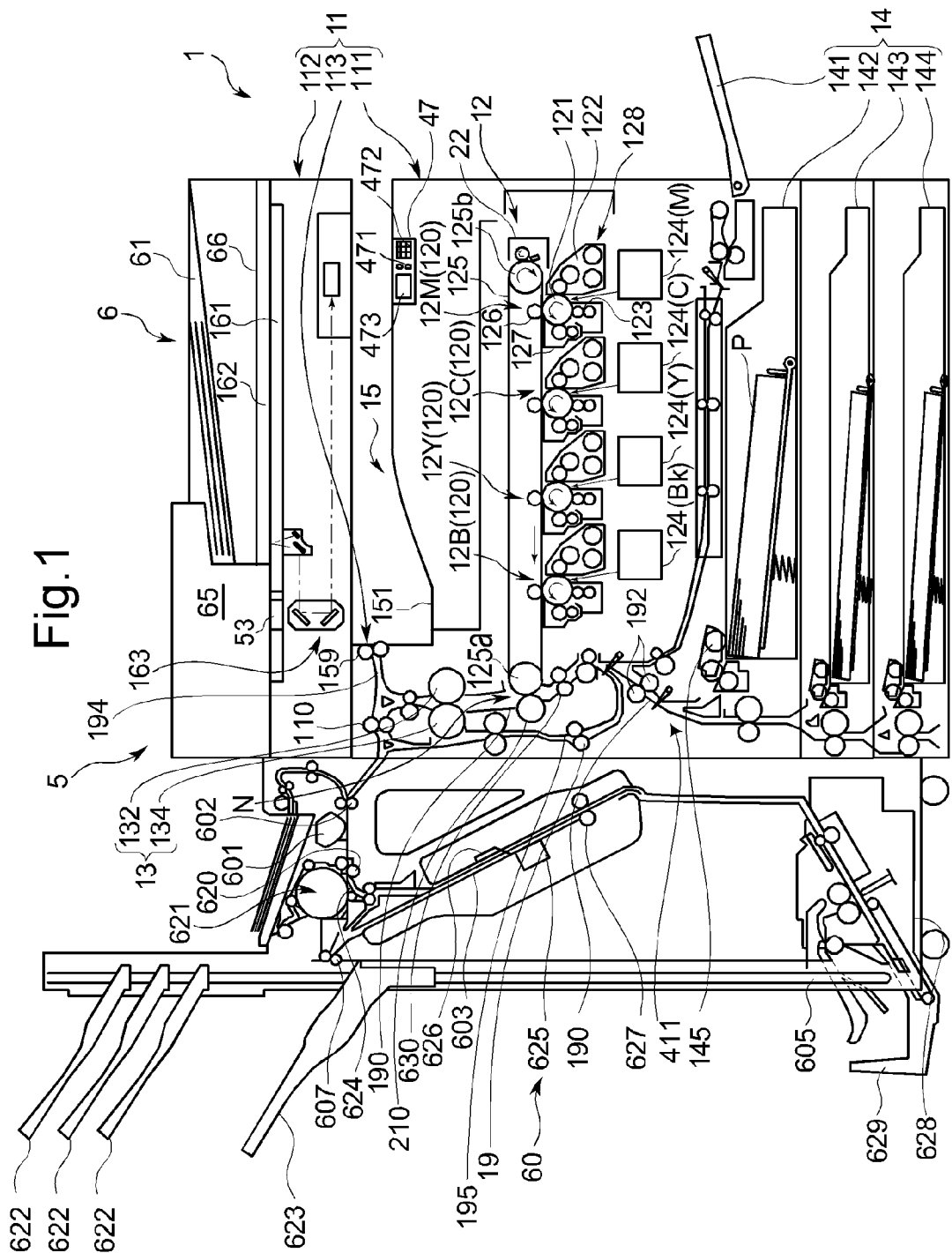
FIG. 1 schematically shows the internal structure of an image forming apparatus according to one embodiment of the present disclosure.

Hereinafter, a description will be given of an image forming apparatus and an image forming method according to an embodiment as one aspect of the present disclosure with reference to the drawings. FIG. 1 schematically shows the internal structure of an image forming apparatus 1 according to one embodiment of the present disclosure.

The image forming apparatus 1 is a multifunction peripheral having multiple functions including, for example, a copy function, a print function, a scan function, and a facsimile function. The image forming apparatus 1 is made up so that an apparatus body 11 includes an operating section 47, an image forming section 12, a fixing section 13, a paper feed section 14, a paper output section 15, a document feed section 6, a document reading section 5, and so on.

The apparatus body 11 includes a lower body 111, an upper body 112 opposed to and above the lower body 111, and a connecting portion 113 provided between the upper body 112 and the lower body 111.

The operating section 47 receives entry of various operation commands from an operator. The operating section 47 includes a start key 471, a ten-key pad 472, and a display 473. The display 473 is formed of, for example, an LCD (liquid crystal display) and its panel portion has a touch panel function.

The document reading section 5 includes an original glass plate 161 which is fitted to the top of an opening in the upper body 112 and on which an original document is to be placed, an openable/closable original cover 162 for holding the original document placed on the original glass plate 161, and a reader 163 for reading an image of the original document placed on the original glass plate 161. The reader 163 optically reads the image of the original document using an image sensor, such as a CCD (charge coupled device), to generate image data.

The document feed section 6 includes a document placement table 61 on which original documents are to be placed, a document ejection portion 66 to which original documents after image reading are to be ejected, and a document conveyance mechanism 65. The document conveyance mechanism 65 includes an unshown paper feed roller, an unshown conveyance roller, and an unshown paper reversing mechanism. The document conveyance mechanism 65 feeds original documents placed on the document placement table 61 sheet by sheet by the drive of the paper feed roller, conveys the document to a position facing a document read slit 53 by the drive of the conveyance roller to allow the reader 163 to read the document through the document read slit 53, and then ejects it to the document ejection portion 66. Furthermore, the document conveyance mechanism 65 allows the paper reversing mechanism to reverse the side of the original document and conveys the document to the position facing the document read slit 53 again to allow the reader 163 to read not only one side of the document but also the other side thereof through the document read slit 53.

The document feed section 6 is pivotally mounted to the upper body 112 so that its front side can move upward. When the front side of the document feed section 6 is moved up to make the top surface of the original glass plate 161 as a document table open, the operator can place, on the top surface of the original glass plate, an original document to be read, for example, an open book with facing pages.

The lower body 111 is internally provided with the image forming section 12, the fixing section 13, and the paper feed section 14. The upper body 112 is provided with the document reading section 5. The paper feed section 14 includes a plurality of, for example, three paper feed cassettes 142, 143, 144 insertable into and removable from the apparatus body 11. Each of the paper feed cassettes 142, 143, 144 contains a paper sheet stack formed of stacked recording paper sheets P (a type of recording medium). For example, the paper feed cassette 142 contains A4-size recording paper sheets, the paper feed cassette 143 contains A3-size recording paper sheets, and the paper feed cassette 144 contains B5-size recording paper sheets.

The image forming section 12 performs an image forming operation of forming a toner image on a recording paper sheet fed from the paper feed section 14. The image forming section 12 includes a magenta image forming unit 12M, a cyan image forming unit 12C, an yellow image forming unit 12Y, and a black image forming unit 12Bk which are sequentially arranged from upstream to downstream in the running direction of an intermediate transfer belt 125 (hereinafter, each image forming unit is also called an "image forming unit 120" when referred to without distinction). The magenta image forming unit 12M uses magenta toner. The cyan image forming unit 12C uses cyan toner. The yellow image forming unit 12Y uses yellow toner. The black image forming unit 12Bk uses black toner. The image forming section 12 also includes the intermediate transfer belt 125 mounted between a plurality of rollers including a drive roller (roller opposed to a secondary transfer roller described below) 125a to be able to endlessly run in a direction of sub scanning for image formation, and a secondary transfer roller 210 which engages against a portion of the intermediate transfer belt 125 wound around the drive roller 125a on the outer peripheral side of the intermediate transfer belt 125.

Each image forming unit 120 includes a developing unit 128 and a primary transfer roller 126 disposed at a position opposed to the developing unit 128 with the intermediate transfer belt 125 interposed therebetween. The developing unit 128 includes a photosensitive drum 121, a developing device 122 operable to supply toner to the photosensitive drum 121, a toner cartridge (not shown) for holding toner, a charging device 123, an exposure device 124, and a drum cleaning device 127.

The intermediate transfer belt 125 is disposed above the photosensitive drums 121. The outer peripheral surface of the intermediate transfer belt 125 is set to an image carrying surface to which a toner image is to be transferred. The intermediate transfer belt 125 is driven by the drive roller 125a while engaging against the peripheral surfaces of the photosensitive drums 121. The intermediate transfer belt 125 endlessly runs between the drive roller 125a and a driven roller 125b while synchronizing with the rotation of each photosensitive drum 121.

Each primary transfer roller 126 is provided at a position opposed to the associated photosensitive drum 121 with the intermediate transfer belt 125 interposed therebetween. The primary transfer roller 126 transfers the toner image formed on the outer peripheral surface of the associated photosensitive drum 121 to the surface of the intermediate transfer belt 125.

A control section 100 (FIG. 2) of the image forming apparatus 1 controls the drive of the primary transfer roller 126 and image forming unit 120 for each color to perform the transfer of a magenta toner image formed by the magenta image forming unit 12M to the surface of the intermediate transfer belt 125, then the transfer of a cyan toner image formed by the cyan image forming unit 12C to the same position of the intermediate transfer belt 125, then the transfer of an yellow toner image formed by the yellow image forming unit 12Y to the same position of the intermediate transfer belt 125, and finally the transfer of a black toner image formed by the black image forming unit 12Bk to superimpose these different colored toner images on each other. Thus, a multicolor toner image is formed on the surface of the intermediate transfer belt 125 (intermediate transfer or primary transfer).

A transfer bias is applied to the secondary transfer roller 210 by an unshown transfer bias application mechanism. The secondary transfer roller 210 transfers the multicolor toner image formed on the surface of the intermediate transfer belt 125, at a nip N between the secondary transfer roller 210 and the drive roller 125a with the intermediate transfer belt 125 in between, to a recording paper sheet conveyed from the paper feed section 14 along a conveyance path 190.

To the left of the image forming section 12 in FIG. 1, a vertically extending conveyance path 190 is formed. The conveyance path 190 is provided at appropriate positions with pairs of conveyance rollers 192. The pairs of conveyance rollers 192 convey a recording paper sheet fed out of the paper feed section 14 toward the nip N and the fixing section 13.

The paper feed section 14 includes a manual feed tray 141 openably and closably provided at a right side wall of the apparatus body 11 in FIG. 1, and the paper feed cassettes 142, 143, 144. Pick-up rollers 145 provided above the paper feed cassettes 142, 143, 144 can feed respective uppermost recording paper sheets of the paper sheet stacks contained in the paper feed cassettes 142, 143, 144 to the conveyance path 190.

A conveyance section 411 is made up of, for example, the pick-up rollers 145, the pairs of conveyance rollers 192, a pair of registration rollers 630, a pair of output rollers 159, and drive sources of these rollers.

The fixing section 13 performs a fixing treatment by applying heat from a heat roller 132 to the toner image on the recording paper sheet transferred in the image forming section 12 while the recording paper sheet is passing through a fixing nip between the heat roller 132 and a pressure roller 134. The recording paper sheet on which a color image has been fixed by the completion of the fixing treatment passes through a paper output path 194 extended from the top of the fixing section 13 and is ejected to a paper output tray 151 or a post-processing unit 60.

The paper output section 15 includes the paper output tray 151. The recording paper sheet having a toner image formed thereon in the image forming section 12 is ejected to the paper output tray 151 after it is subjected to a fixing treatment in the fixing section 13.

In the case of forming images on both sides of the recording paper sheet P in the image forming section 12, under the control of the control section 100, the recording paper sheet P having an image already formed on one side in the image forming section 12 is nipped between the pair of output rollers 159 provided toward the paper output tray 151, then moved back and conveyed by the pair of output rollers 159 to a reverse conveyance path 195 branched off from the paper output path 194 and provided as a portion of the conveyance path 190, and conveyed again upstream of the nip N and the fixing section 13 in a direction of conveyance of the recording paper sheet P by pairs of conveyance rollers 19 provided at different locations in the reverse conveyance path 195. Thus, an image is formed on the other side of the recording paper sheet P by the image forming section 12.

The image forming apparatus 1 further includes the post-processing unit 60. The post-processing unit 60 includes a punching section 601 operable to punch the recording paper sheet carried therein from a pair of output rollers 110 of the apparatus body 11 as a type of post-processing, a conveyance roller 602 operable to convey the recording paper sheet carried in the post-processing unit 60, a paper sheet cradle 603 operable as a recording paper sheet stack to temporarily store conveyed recording paper sheets, a conveyance roller 620 operable to convey the recording paper sheet with an image formed thereon and the original document each conveyed by the conveyance roller 602, a pair of output rollers 607 operable to discharge the recording paper sheet conveyed from the paper sheet cradle 603 to a main paper output tray 623, an escape drum 621 operable to escape the recording paper sheet being conveyed next when post-processing will not keep up with the incoming next recording paper sheet, a mailbox 622 formed of a plurality of bins and the main paper output tray 623 all of which can be moved up and down by an unshown lift and to which the recording paper sheet conveyed from the paper sheet cradle 603 and the recording paper sheet directly conveyed from the conveyance roller 602 can be discharged, and a conveyance branching guide 624 operable to switch the direction of conveyance of the recording paper sheet coming from the conveyance roller 620 between a way to the paper sheet cradle 603 and a way to the pair of output rollers 607 which will discharge the recording paper sheet to the mailbox 622 or the main paper output tray 623.

The post-processing unit 60 further includes a stapling device 625 operable to staple the recording paper sheets conveyed to the paper sheet cradle 603 as a type of post-processing, a stop member 626 capable of receiving the lower ends of the recording paper sheets conveyed to the paper sheet cradle 603 and holding the recording paper sheets, a conveyance roller 627 operable to convey the recording paper sheets downward from the paper sheet cradle 603, a booklet forming section 628 operable to fold a stack of the recording paper sheets conveyed from the conveyance roller 627 at their middle lines to bring them together in booklet form, and a paper output tray 629 to which the recording paper sheets brought together for a booklet by the booklet forming section 628 are discharged.

For example, the recording paper sheet stack conveyed from the conveyance roller 627 is placed on a placement table 609 of the booklet forming section 628. In doing so, the recording paper sheet stack is placed on the placement table 609 so that its middle is located facing the nip between a pair of conveyance rollers 610 disposed above the placement table 609. When in this state a push member 608 located below the recording paper sheet stack moves up toward the nip and pushes the middle of the recording paper sheet stack into the nip by a driving force applied from an unshown drive source, the recording paper sheet stack is folded in the middle. The folded recording paper sheet stack is conveyed by the pair of conveyance rollers 610, passes through a conveyance path 640, and is then discharged to the paper output tray 629.

The paper sheet cradle 603 includes a drive part (not shown) operable to move the stop member 626 in a direction of discharge of the recording paper sheet. The drive part actuates in response to a control signal from the control section 100, so that the recording paper sheet held on the stop member 626 is conveyed to the pair of output rollers 607 and discharged to the main paper output tray 623 by the pair of output rollers 607.

The lift 605 is configured to raise and lower the position of the main paper output tray 623 in response to a control signal from the control section 100 so that the upper surface of the stack of recording paper sheets already discharged on the main paper output tray 623 is located at a reference position suitable for the discharge of the next stack of recording paper sheets from the pair of output rollers 607.

Figure 2:
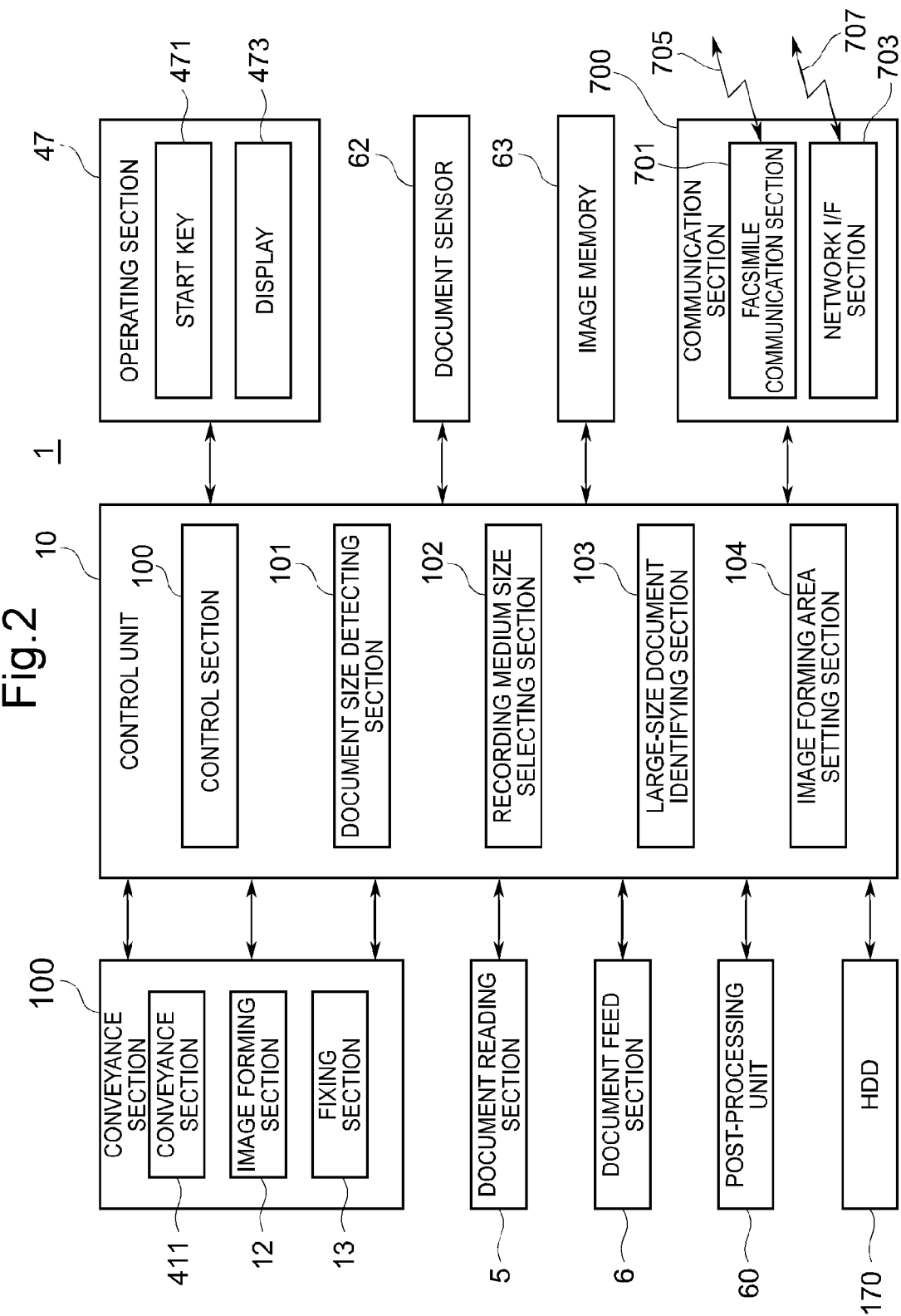
FIG. 2 is a block diagram showing the electric configuration of the image forming apparatus.

FIG. 2 is a block diagram showing the electric configuration of the image forming apparatus 1 shown in FIG. 1. The image forming apparatus 1 has a configuration in which a control unit 10, the apparatus body 11, the document reading section 5, the document feed section 6, the operating section 47, the post-processing unit 60, a communication unit 700, the image data processing section 611, and an HDD (hard disk drive) 170 are connected to each other via a bus. Since the components of the apparatus body 11, the document reading section 5, the document feed section 6, the operating section 47, and the post-processing unit 60 have already been described, a description thereof will not be repeated here.

The communication unit 700 includes a facsimile communication section 701 and a network I/F section 703. The facsimile communication section 701 includes an NCU (network control unit) operable to control the connection with a destination facsimile via a telephone network and a modem circuit operable to modulate and demodulate signals for facsimile communication. The facsimile communication section 701 can be connected to a telephone network 705.

The network I/F section 703 can be connected to a LAN (local area network) 707. The network I/F section 703 is a communication interface circuit for performing communication with terminal devices connected to the LAN 707, such as personal computers.

The HDD 170 is used to store image data output from the document reading section 5, image data sent from personal computers through the communication unit 700, image data received by facsimile through the communication unit 700, and so on.

A document sensor 62 is a sensor provided at the document placement table 61 of the document reading section 5 and configured to detect the size of each of original documents placed on the document placement table 61. For example, the document sensor 62 is composed of either one or both of (1) a sensor provided inside the document placement table 61 and configured to detect the document size by applying light to the original document lying thereabove through a light transmissive window and detecting edges of the original document depending upon whether to receive the reflected light and (2) a sensor configured to detect the document size by detecting the position of a document guide for alignment of the right and left edges and trailing edges of a stack of original documents placed on the document placement table 61. The document sensor 62 outputs the detection result to a document size detecting section 101 of the control unit 10. The combination of the document sensor 62 and the document size detecting section 101 is an example of the document size detecting section defined in "What is claimed is".

A description is given below of the control unit 10. The control unit 10 includes a CPU (central processing unit), a ROM (read only memory), a RAM (random access memory), and so on. The ROM stores software necessary for controlling the operation of the image forming apparatus 1. The RAM is used to temporarily store data generated during execution of software and store applications software.

The control unit 10 includes the control section 100, the document size detecting section 101, a recording medium size selecting section 102, a large-size document identifying section 103, and an image forming area setting section 104.

The control section 100 governs the overall operation control of the image forming apparatus 1 and controls the operations of the mechanisms included in the image forming apparatus 1. Furthermore, the control section 100 controls the operation of image formation of the image forming section 12 based on image data sets generated by document reading in the document reading section 5.

The document size detecting section 101 is configured to, based on the detection result acquired from the document sensor 62, detect the size of each of the original documents to be read by the document reading section 5. The document size detecting section 101 stores in advance the document widths (in this case, the dimensions in a direction perpendicular to the direction of conveyance of original document) and document lengths (in this case, the dimensions in the direction of conveyance of original document) of various document sizes, such as A4 size, A3 size, B4 size, and B5 size. By reference to the stored document width and document length of each predetermined document size, the document size detecting section 101 detects the document size matching the document width and document length indicated by the detection result acquired from the document sensor 62.

The recording medium size selecting section 102 is configured to select, for the purpose of booklet printing, the size of recording paper sheets P for use in forming images from image data sets acquired by reading a plurality of original documents in the document reading section 5.

The booklet printing refers to a technique of reading one side or both sides of each of a plurality of original documents and producing prints in which a set of images formed from the read original documents are arranged on both sides of recording paper sheets of a size equal to two original documents laid side by side, with four pages per recording paper sheet, to match the page order of the original documents during reading with the page order of the resultant prints laid one on another in booklet form. The stack of recording paper sheets printed in booklet page order is discharged as a booklet after being center-folded by the post-processing unit 60.

The following are examples of a size of recording paper sheets P to be selected for booklet printing by the recording medium size selecting section 102. (1) For example, when the original documents to be read by the document reading section 5 are of A4 size, the size to be selected is A3 size so that images from the original documents of A4 size can be formed, for booklet printing, with two pages on each side of each recording paper sheet P. (2) When, for example, the original documents to be read by the document reading section 5 are of mixed sizes consisting of A4 and A3, the recording medium size selecting section 102 selects A3 size as the size to be applied for image formation so that images from the original documents of A4 size can be formed, for booklet printing, with two pages on each side of a recording paper sheet P and each of images from the original documents of A3 size can be formed on the entirety of an imagable area (area capable of image formation) of one side of a recording paper sheet P. (3) When the original documents to be read by the document reading section 5 are of B5 size or of mixed sizes consisting of B4 and B5, the recording medium size selecting section 102 selects B4 size for booklet printing in the same manners as in (1) and (2) above.

The large-size document identifying section 103 is configured to identify, from among image data sets of a plurality of original documents generated by the document reading section 5, an image data set of an original document whose document size detected by the document size detecting section 101 is greater than a predetermined document size. Examples of the predetermined document size are as follows (a) when the original documents to be read by the document reading section 5 are of mixed sizes consisting of B4 and B5, the predetermined document size is B5 size, (b) when the original documents to be read by the document reading section 5 are of mixed sizes consisting of A3 and A4, the predetermined document size is A4 size. The original document whose document size is greater than the predetermined document size refers to an original document the aforementioned document length of which is greater than the document length of an original document having the predetermined document size.

As for, out of respective image data sets of a plurality of original documents generated by the document reading section 5, an image data set of an original document whose document size detected by the document size detecting section 101 is the predetermined document size, the image forming area setting section 104 sets one half of the imagable area of one side of a recording paper sheet P of the size selected for booklet printing by the recording medium size selecting section 102 to an image forming area for the image data set in a layout for the booklet printing.

For, out of the image data sets of the plurality of original documents, an image data set of an original document whose document size is greater than the predetermined document size, the image forming area setting section 104 sets the entire imagable area of one side of a recording paper sheet P of the selected size to an image forming area for the image data set.

An image memory 63 provides a temporary storage region in which the image data sets of original documents read by the document reading section 5 are to be temporarily stored.

Figure 3:
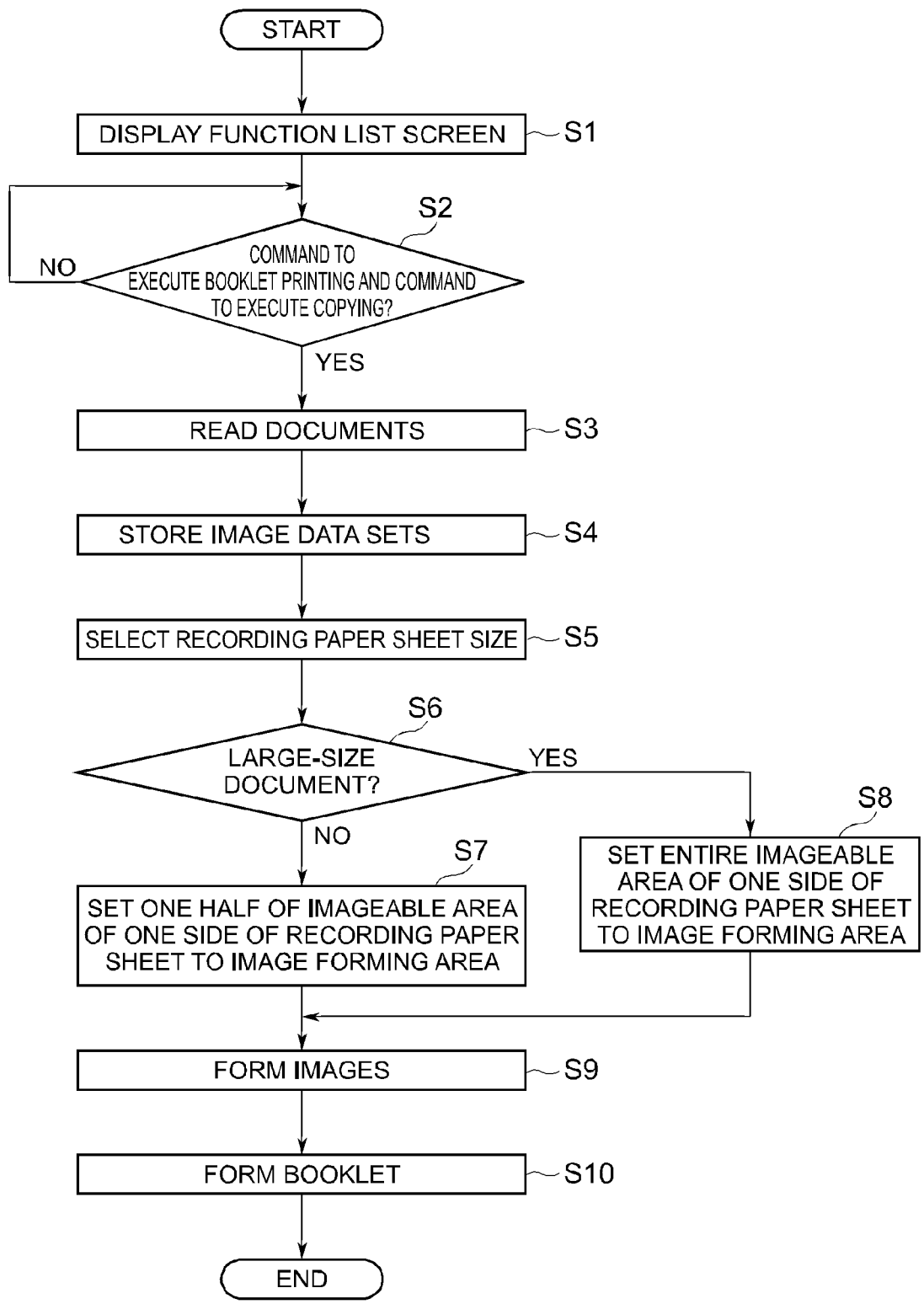
FIG. 3 is a flowchart showing processing of booklet printing for original documents of mixed document sizes in the image forming apparatus.
Figure 4:
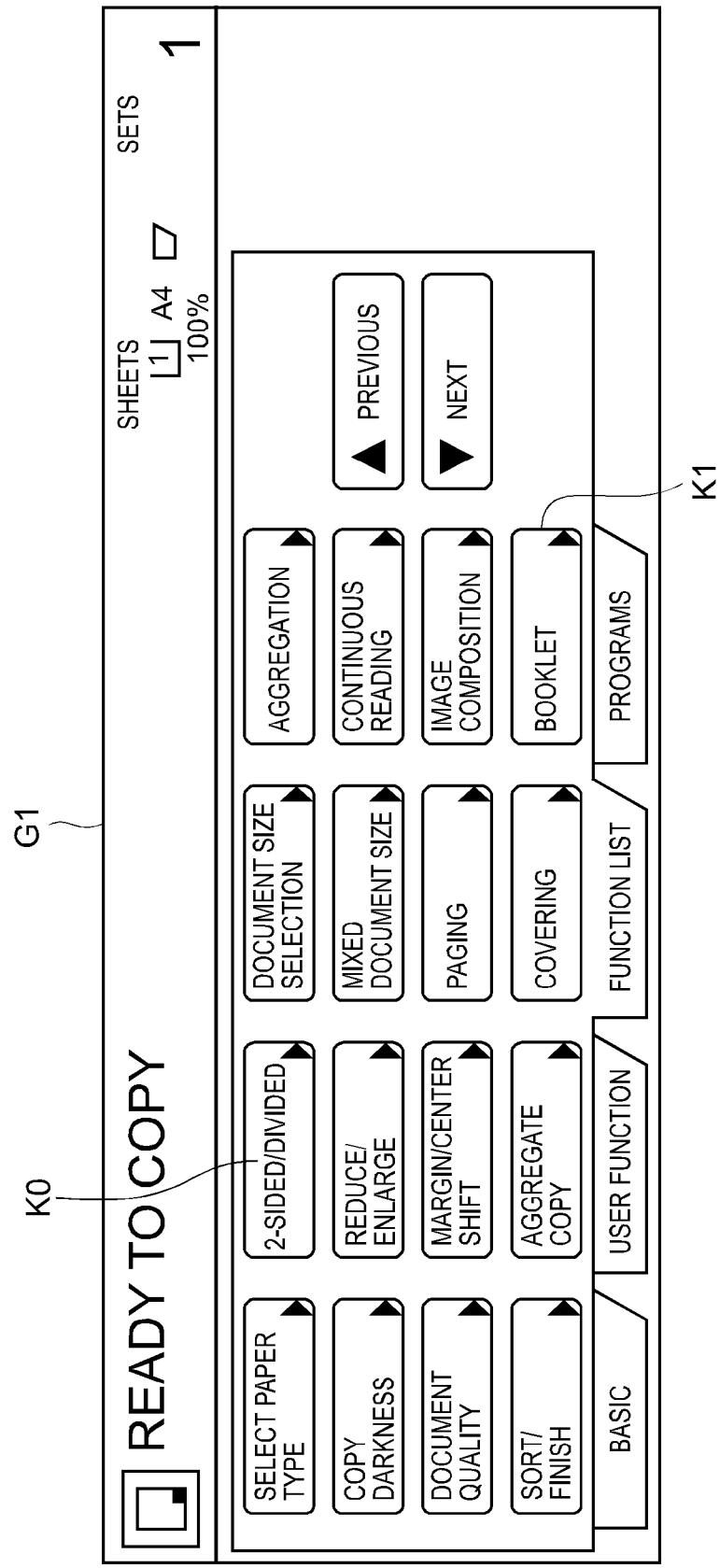
FIG. 4 is a view showing an example of a display screen of a display.
Figure 5:
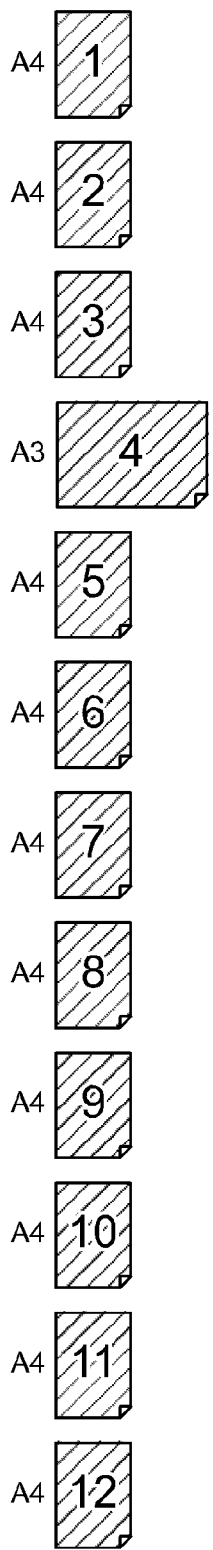
FIG. 5 is a diagram showing an example of twelve original documents to be read.
Figure 6:
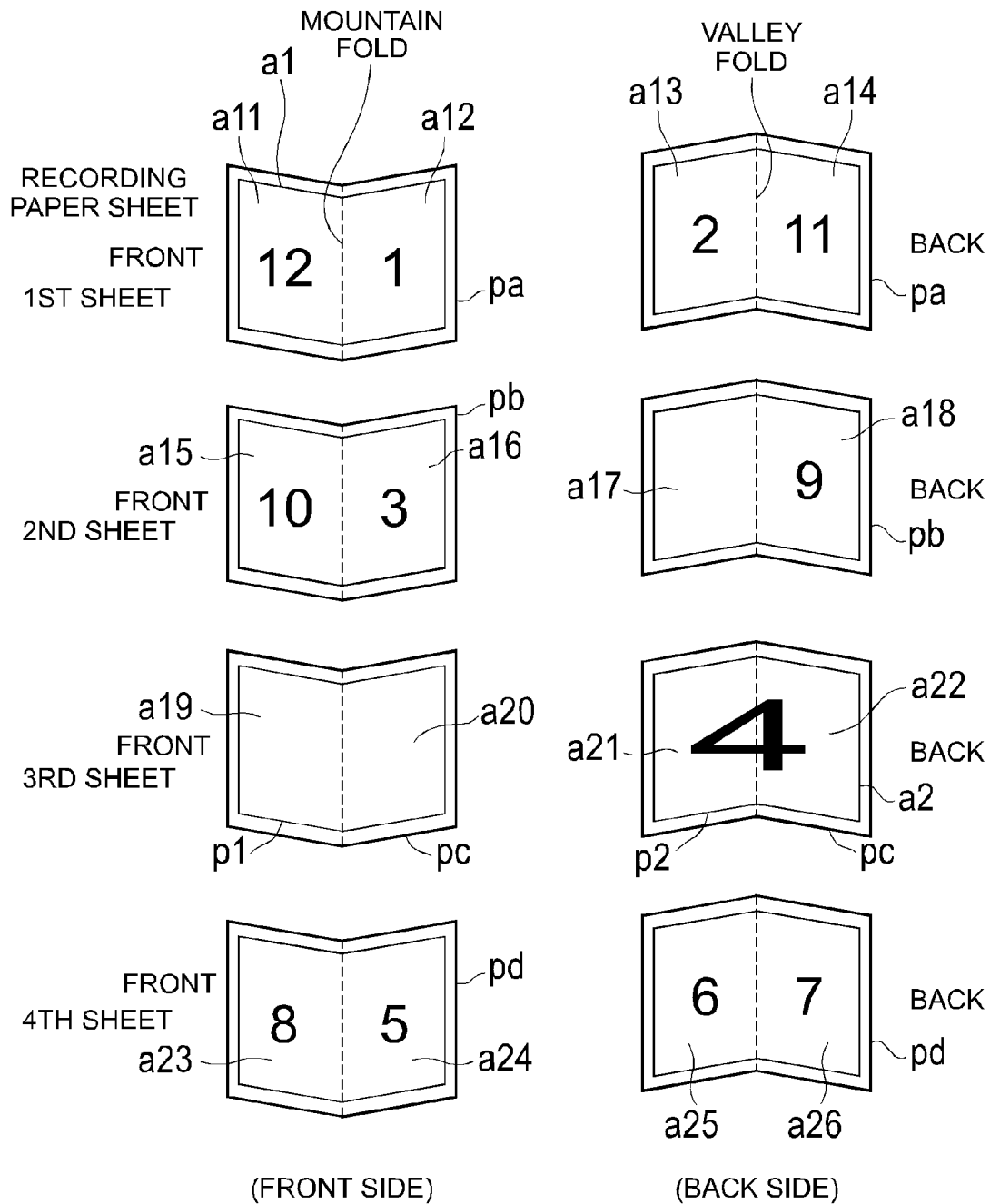
FIG. 6 is a diagram showing an example of an order of printing on recording paper sheets for the twelve original documents shown in FIG. 5.
Figure 7:
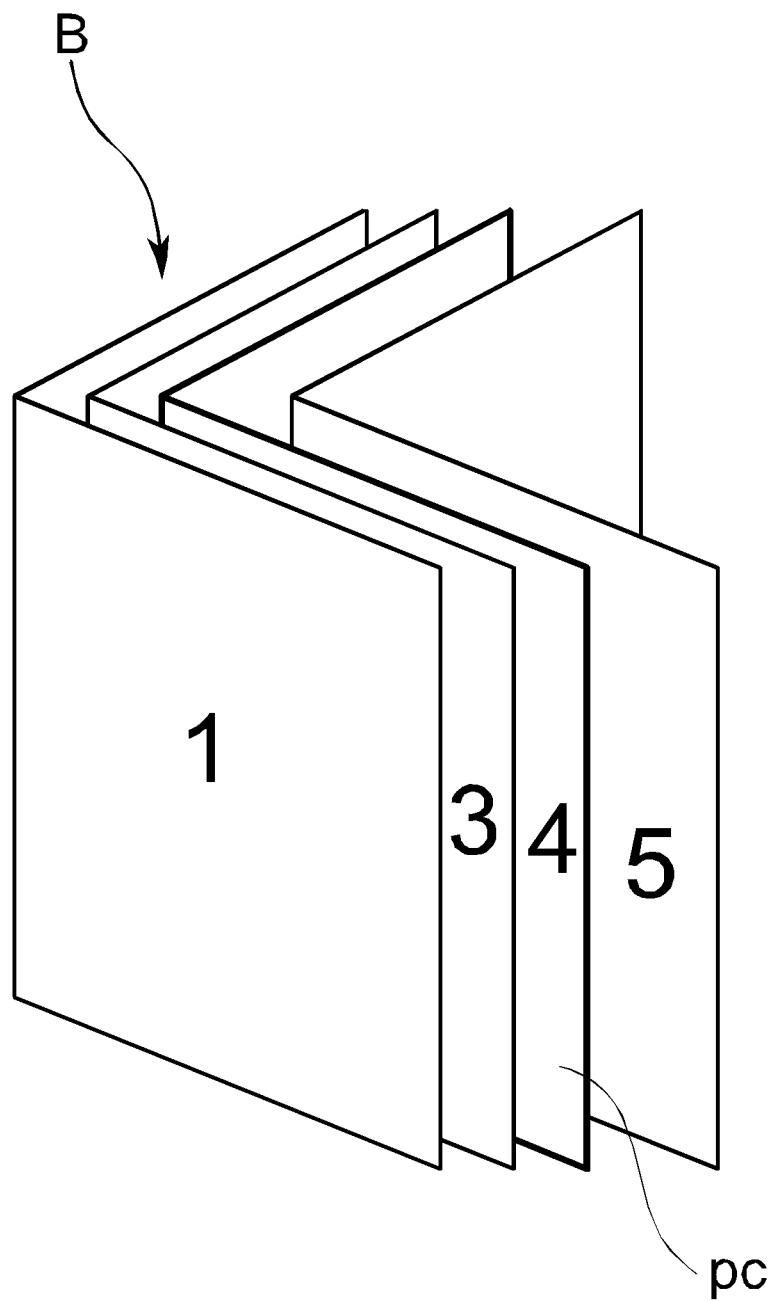
FIG. 7 is a view showing an example of a state in which the four recording paper sheets shown in FIG. 6 are superposed and center-folded.
Figure 8:
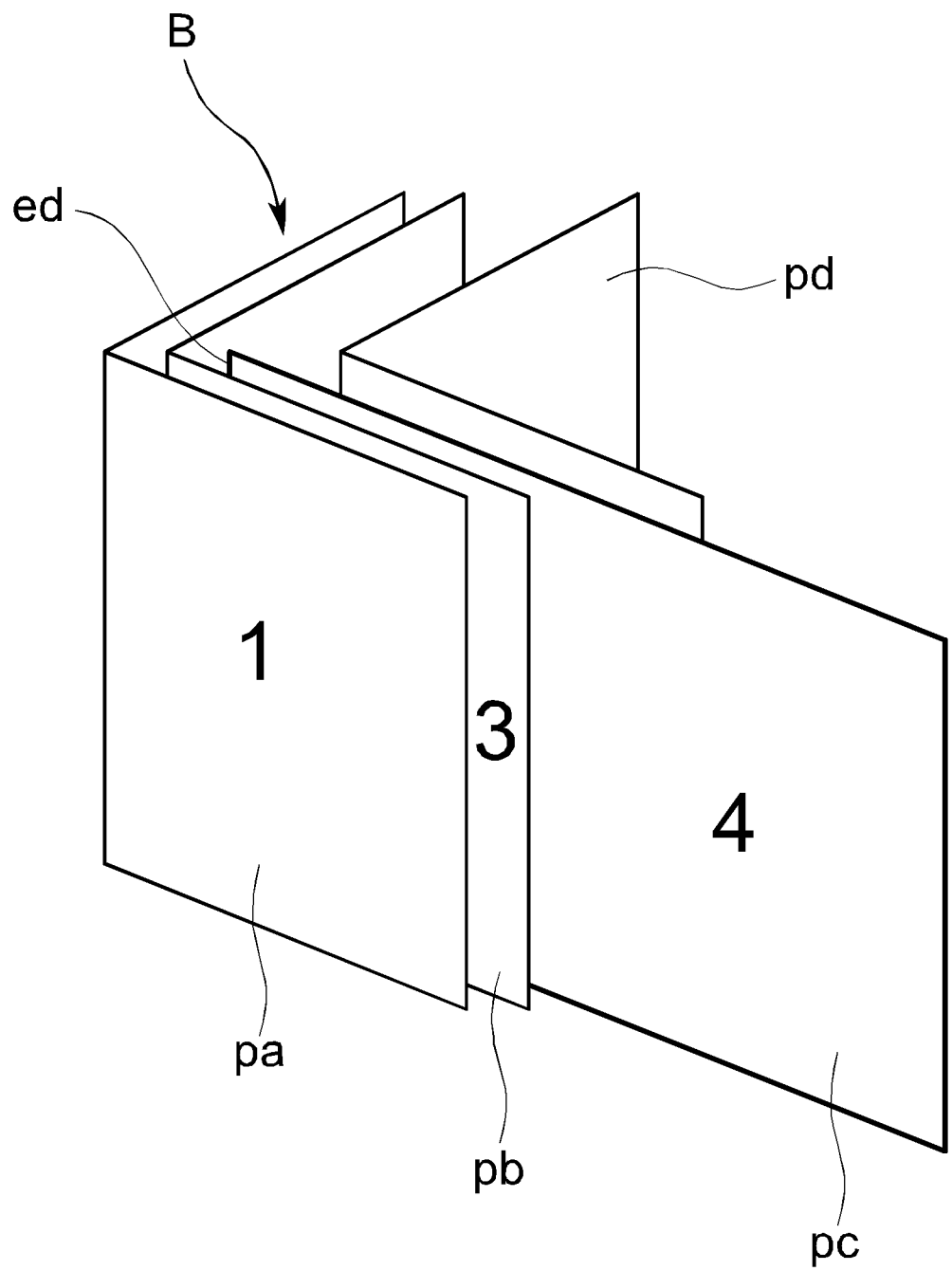
FIG. 8 is a view showing another example of a state in which the four recording paper sheets shown in FIG. 6 are superposed and center-folded.
Figure 9:
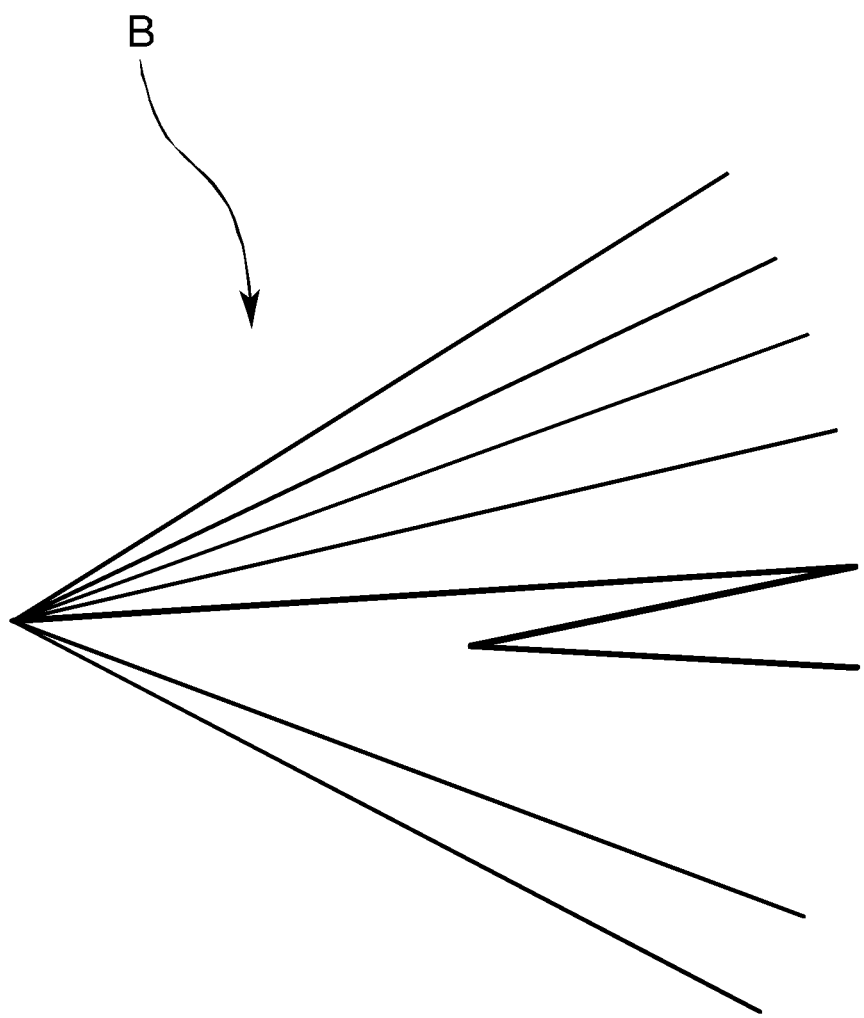
FIG. 9 is a view showing a printed matter obtained by booklet printing.
Figure 10:
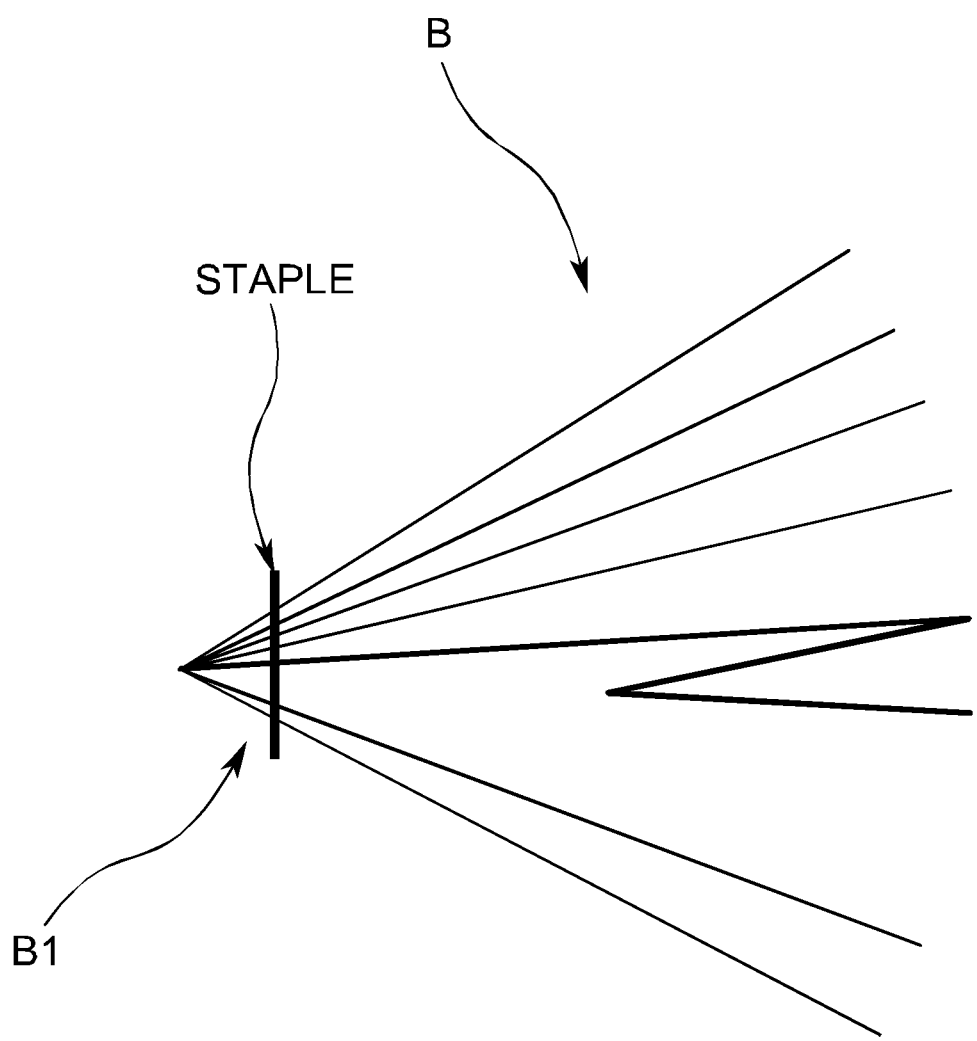
FIG. 10 is another view showing the printed matter obtained by booklet printing.

Next, with reference to FIG. 3, a description will be given of processing and method of booklet printing for original documents of mixed document sizes using the image forming apparatus 1 according to this embodiment. FIG. 3 is a flowchart showing the processing of booklet printing for original documents of mixed document sizes in the image forming apparatus 1. FIG. 4 is a view showing an example of a display screen of the display 473. FIG. 5 is a diagram showing an example of twelve original documents to be read. FIG. 6 is a diagram showing an example of an order of printing on recording paper sheets for the twelve original documents shown in FIG. 5. FIGS. 7 and 8 are views showing examples of a state in which the four recording paper sheets shown in FIG. 6 are superposed and center-folded. FIGS. 9 and 10 are views showing a printed matter obtained by the booklet printing. FIG. 11 is a diagram showing, in page order, printed elements of a printed matter obtained by the booklet printing using the image forming apparatus 1.

In this embodiment, consideration is given to the case where a stack of a plurality of original documents having the same document width but different document sizes is placed on the document placement table 61 of the document reading section 5 and the document reading section 5 reads the stack of original documents.

When the main power of the image forming apparatus 1 is turned on, the control section 100 allows the image forming apparatus 1 to stand by, ready for copying and allows the display 473 of the operating section 47 to display a function list screen G1 (FIG. 4) which is a default screen to be displayed on stand-by of the image forming apparatus 1 (S1).

When a command to execute reading of single-sided original documents in the document reading section 5 and double-sided printing of recording paper sheets in the image forming section 12 is input by an operator through the touch panel function such as with the push of the "2-Sided/Divided" key K0 on the function list screen G1, a command to execute booklet printing is input through the touch panel function with the push of the "Booklet" key K1, and a command to execute copying is input by an operator's operation of the start key 471 of the operating section 47 (see FIG. 1) (YES in S2), the control section 100 allows the document reading section 5 to start to read the original documents of mixed document sizes placed on the document placement table 61 (perform a mixed document size reading operation) (S3).

The mixed document size reading operation refers to an operation of reading a plurality of original documents of different document sizes placed on the document placement table 61. Furthermore, in this embodiment, a designation of a recording paper sheet size automatic setting mode for setting the size of the recording paper sheet for use in forming an image from each image data set acquired by the above document reading in the document reading section 5, not by a command from an operator, but by the image forming apparatus 1 itself is input by the operator's operation of the operating section 47. Thus, the control section 100 performs the above reading of single-sided original documents (or possibly reading of double-sided original documents) and booklet printing in the recording paper sheet size automatic setting mode. Moreover, as described previously, a plurality of original documents having the same document width but different document sizes are read by the document reading section 5.

The control section 100 allows the image memory 63 or the HDD 170 to store the image data sets of all of original documents read by the document reading section 5 (S4). Concurrently, the control section 100 allows the image memory 63 or the HDD 170 to store, in association with each image data set, information about the document size of the image data set detected by the document sensor 62 and the document size detecting section 101 and information about to which page of the original documents the image data set corresponds as well.

Subsequently, the recording medium size selecting section 102 selects, for booklet printing, the size of recording paper sheets P for use in forming images from the image data sets acquired by reading the plurality of original documents in the document reading section 5 (S5). For example, the recording medium size selecting section 102 selects the size of recording paper sheets for use in forming images in such a manner as in (1) to (3) above. Here, a description will be given of an example where, as shown in FIG. 5, the original documents to be read by the document reading section 5 are of mixed sizes consisting of A3 and A4. In this example, the recording medium size selecting section 102 selects A3 as the size of recording paper sheets P.

Subsequently, the large-size document identifying section 103 identifies, from among the image data sets of the plurality of original documents generated by the document reading section 5, an image data set of an original document whose document size is greater than the aforementioned predetermined document size (S6). In the example of this embodiment, the large-size document identifying section 103 identifies an image data set of an original document whose document size is A3 size, which is greater than A4 size.

Here, as for the image data sets whose document size has been identified as the predetermined document size (A4 size in this embodiment) by the large-size document identifying section 103 (NO in S6), the image forming area setting section 104 sets one half of the imagable area of one side of a recording paper sheet P of the size selected in S5 to an image forming area for each of the image data sets and allocates the image data sets to their respective image forming areas in a layout for the booklet printing (S7).

On the other hand, for the image data set of the large document size (A3 size in this embodiment) identified as a greater size than the above predetermined document size by the large-size document identifying section 103 (YES in S6), the image forming area setting section 104 sets the entire imagable area of one side of a recording paper sheet P of the size selected in S5 to an image forming area for the image data set (S8).

For example, as shown in FIG. 6, the image forming area setting section 104 sets, for each of the image data sets of A4 size, an area a12 half an imagable area a1 of one side of a recording paper sheet P of the selected A3 size to an image forming area for the image data set. In this case, as shown in FIG. 6, the image forming area setting section 104 allocates the image data sets to half areas a11 to a26 of individual sides of the recording paper sheets P for use in forming images so that when a printed matter for a booklet obtained by the above booklet forming is flipped over pages one by one, the page order of the printed matter can match the page order of the image data sets.

On the other hand, as shown in FIG. 6, the image forming area setting section 104 sets, for the image data set of A3 size, the entire imagable area a2 of one side $P_2$ of a recording paper sheet Pc of the selected A3 size to an image forming area for the image data set.

In this case, as for the image forming areas a19, a20 of the other side $P_1$ of the same recording paper sheet Pc opposite to the one side $P_2$ thereof on which the image data set of A3 size (large document size) is to be formed as an image, the image forming area setting section 104 does not set them to any image forming area for any image data set. In addition, also for the image forming area a17 of the recording paper sheet Pb to which the image data set of A3 size (large document size) would be allocated if it were an image data set of A4 size (the predetermined document size), the image forming area setting section 104 does not set the image forming area a17 to any image forming area for any image data set.

In other words, if an image forming area of a recording paper sheet to which such an image data set of large document size was supposed to be allocated has an area not large enough to form an image from the image data set of large document size, the image forming area setting section 104 does not set the image forming area to any image forming area for any image data set. By contrast, if the side of the recording paper sheet to which such an image data set of large document size is supposed to be allocated can provide the entire imagable area thereof as an image forming area for the image data set, the image forming area setting section 102 sets the image forming area to an image forming area for the image data set of large document size.

More preferably, the image forming area setting section 104 sets the side of the recording paper sheet Pa which will be the valley side (inside) when center-folded later to an image forming area for the image data set of A3 size (large document size). Specifically, as described previously, in the post-processing unit 60, the stack of recording paper sheets are pushed up on the placement table 609 of the booklet forming section 628 by the push member 608 and thus folded in the middle, resulting in a printed matter in booklet form. The image forming area setting section 104 sets the image forming areas under the condition that the sides of the recording paper sheets P which during this booklet forming will face the push member 608 are the valley sides.

When, as described above, the size of recording paper sheets P is selected by the recording medium size selecting section 102 (S5) and the image forming areas for all of image data sets are set (S6 to S8), the control section 100 allows the conveyance section 411 to convey to the image forming section 12 the recording paper sheets P of the size selected for the image data sets of all of the original documents stored such as in the image memory 63 and then allows the image forming section 12 to form images on the set image forming areas of the recording paper sheets P (S9).

Thereafter, the recording paper sheets P subjected to image formation are conveyed, under the control of the control section 100, to the post-processing unit 60, laid in a stack on the paper sheet cradle 603, then conveyed to the placement table 609 of the booklet forming section 628, and then folded in booklet form by the push member 608 (S10), resulting in a printed matter. The printed matter in booklet form is discharged to the paper output tray 629.

At this time, as shown in FIG. 7, the printed matter B discharged to the paper output tray 629 is in a state where the recording paper sheets P are folded and superposed one upon another. An operator pulls the recording paper sheet Pc having an image formed from the image data set of A3 size (large document size) out of the printed matter B, makes it unfolded as shown in FIG. 8, and inserts the unfolded recording paper sheet between the second recording paper sheet Pb and the fourth recording paper sheet Pd until an edge ed of the recording paper sheet Pc abuts on the fold line of the stack of recording paper sheets.

Next, the operator folds inward the unfolded recording paper sheet Pc in the middle along the valley fold line formed by pushing of the push member 608 and further folds back the folded half to form a Z-fold as shown in FIG. 9. Thus, the side edge of the recording paper sheet Pc is aligned with the side edges of the other recording paper sheets Pa, Pb, Pd. Thereafter, the operator binds the printed matter B at an end $B_1$ by staples as shown in FIG. 10.

The recording paper sheet Pc has a valley fold line formed on the side having an image formed thereon. Therefore, for example, in Z-folding the recording paper sheet Pc of the resulting printed matter with the side having an image as the inside to fit the recording paper sheet Pc to the size of the other recording paper sheets Pa, Pb, Pd, the operator can perform folding work with efficiency using the valley fold line.

FIG. 11 is diagram showing a page order of a booklet formed of the printed matter B bound by stapling. The numbers shown in the recording paper sheets in FIG. 11 refer to the page order of the image data sets. As shown in FIG. 11, in this embodiment, the image data sets constituting the first to third pages are allocated to the first to third faces of the printed matter B. When the printed matter B is flipped in order from the first face, then in due course the blank fourth face forming a spread with the fifth face appears and, on the right side of the fourth face, one side of the recording paper sheet Pc appears as the fifth face on the entire area of which the image data set of A3-size original document (corresponding to the fourth page) is printed. When the fifth face is flipped, then the reverse side of the recording paper sheet Pc appears as the blank sixth face forming a spread with the sixth face and the image data set constituting the fifth page is printed on the seventh face located on the right side of the sixth face. Following the seventh face, the eighth to fourteenth faces appear on which the respective image data sets constituting the sixth to twelfth pages are printed.

As thus far described, when, in the image forming apparatus 1 according to this embodiment, a plurality of original documents are determined to be mixed original documents including an original document of large document size (for example, A3 size) and an image data set of the original document of large document size out of image data sets obtained by reading the plurality of original documents is formed as an image, the image is printed on the entire imagable area of one side of a recording paper sheet P. On the other hand, when an image data set of an original document of the predetermined document size (for example, A4 size) out of the above image data sets is formed as an image, the image is printed, according to a layout for booklet printing, on an area half the imagable area of one side of a recording paper sheet P.

Therefore, in forming an image from an image data set of an original document of large document size on a recording paper sheet P by booklet printing, the need to reduce the scale of the image data set of large document size can be decreased as much as possible, which decreases the reduction of the printed matter readability. Furthermore, since even a large-size original document is not divided into a plurality of image areas for printing unlike the conventional technique, this prevents the occurrence of partial missing image due to staples and the creation of a gap not existing on the original document.

In other words, with this embodiment, in booklet printing for a set of original documents of mixed image sizes, even if the size of an image read from one of the original documents is greater than a default image forming area, a printed matter minimizing the reduction of readability can be obtained.

Furthermore, in the image forming apparatus 1 according to this embodiment, as for the image forming area of the side of a recording medium opposite to the side thereof on which an image data set of large document size is to be formed as an image, the image forming area setting section 104 does not set it to any image forming area for any image data set. Also for the image forming area of the recording medium to which an image data set of large document size would be allocated if it were an image data set of the predetermined document size and which is not large enough to form an image from the image data set of large document size, the image forming area setting section 104 does not set the image forming area to any image forming area for any image data set.

Therefore, the side of the recording medium opposite to the side thereof on which an image data set of large document size is to be formed as an image does not have any image formed and is blank. Likewise, the image forming area on which the image data set of large document size was originally supposed to be formed as an image does not have any image formed and is blank. Thus, a recording medium having the image data set of large document size formed as an image on one side thereof can be placed exactly without changing the predetermined page order of image data sets set according to a layout for booklet printing.

As thus far described, in this embodiment, a description has been given of, as an example, the case of twelve original documents of mixed document sizes consisting of A4 and A3. However, no particular limitation is placed on the number of original documents. In addition, the above processing of booklet printing for mixed document sizes can also be applied to the case where a plurality of original documents of mixed document sizes consisting of B5 and B4 are read by the document reading section 5.

The present disclosure is not limited to the above embodiment and can be modified in various ways. For example, the above processing of booklet printing for mixed document sizes is not limited to the case where the number of original documents of large document size included in the set of original documents of mixed sizes is one. This processing of booklet printing can be implemented likewise in the case where the number of original documents of large document size included is two or more.

For example, if in the example of original documents shown in FIG. 5 not only the fourth original document but also the ninth original document are of large document size (A3 size), the large-size document identifying section 103 identifies the fourth and ninth original documents as large-size original documents and the image forming area setting section 104 sets, also for the ninth original document, the entire imagable area of one side of a recording paper sheet P to an image forming area, in the same manner as for the fourth original document.

In the above embodiment, the document sizes described in (a) and (b) above have been mentioned as examples of the document size for use as a threshold value when the large-size document identifying section 103 determines whether or not each image data set is of large document size. However, the scope of the present disclosure is not always limited to these examples. For example, the large-size document identifying section 103 may select a document size for use as a threshold value from all of document sizes of image data sets of a plurality of original documents generated by the document reading section 5, except for the greatest document size. Alternatively, the large-size document identifying section 103 may select, as an document size for use as a threshold value, a size half that of the recording paper sheet P selected for booklet printing by the recording medium size selecting section 102.

In the above embodiment, a description has been given of an example where when image data sets have not been determined to be greater than the predetermined document size by the large-size document identifying section 103, the image forming area setting section 104 sets an area half the imagable area to an image forming area for each of the image data sets and the image forming section 12 forms an image on the set image forming area (S6, S7, S9). However, the scope of the present disclosure is not always limited to this example. Image data sets not determined to be greater than the predetermined document size in the processing in S6 may include image data sets of the same size as the predetermined document size and image data sets of smaller size than the predetermined document size. For the image data sets of smaller size than the predetermined document size, the control section 100 may enlarge the image data sets to the predetermined document size and then the image forming section 12 may form images from the enlarged image data sets on set image forming areas. Thus, in each half area of each side of each recording paper sheet P, the margin with no image formed can be reduced.

As an image forming apparatus capable of performing booklet printing, an image forming apparatus is known in which when, during printing for original documents of mixed document sizes, the size of an image data set generated from one of the read original documents is greater than an image forming area of a recording paper sheet, the scale of the image data set is changed by calculating an appropriate reduction ratio to fit the image data set in the image forming area, which is one half of a printable area of one side of the recording paper sheet. This known image forming apparatus can prevent the occurrence of image defect due to shortage of image forming area. However, when the calculated reduction ratio is too high, the readability of the reduced image in a booklet decreases.

In another known image forming apparatus, when the size of an image data set of a read original document is greater than an image forming area, the image data set is divided into right and left halves and the divided halves are allocated on recording paper sheets to form a pair of facing pages in a finished booklet. This known image forming apparatus decreases the reduction of image readability due to scale reduction. However, the image may be partly lost in the middle portion between facing pages of the booklet by stapling or a gap not existing on the original document may appear, so that the image readability may be reduced owing to these factors.

Unlike these conventional techniques, with the above embodiment according to the present disclosure, as described previously, in booklet printing for a set of original documents of mixed image sizes, even if the size of an image read from one of the original documents is greater than a default image forming area, a printed matter minimizing the reduction of readability can be obtained.

Although the description of the above embodiment is given taking multifunction peripheral as an example of the image forming apparatus according to the present disclosure, the example is merely illustrative and the image forming apparatus may be any image forming apparatus other than the multifunction peripheral, such as a copier, a scanner or a facsimile machine.

The structures, pieces of processing, and methods shown in the above embodiment with reference to FIGS. 1 to 11 are merely illustrative of the present disclosure and not intended to limit the scope of the present disclosure to the above particular structures, pieces of processing, and methods.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus configured to perform booklet printing,
wherein the booklet printing is a printing which reads a plurality of original documents and produces prints in which a set of images formed from the read original documents are arranged on both sides of recording medium of a size equal to two original documents laid side by side, with four pages per recording medium, to match the page order of the original documents during reading with the page order of the resultant prints laid one on another in booklet form,
the image forming apparatus comprises:
a document reading section configured to read a plurality of original documents of mixed document sizes to generate respective image data sets of the original documents;
a document size detecting section configured to detect respective document sizes of the original documents to be read by the document reading section;
a recording medium size selecting section configured to, based on the document sizes detected by the document size detecting section, select a size of recording media for booklet printing and for use in forming images from the image data sets of the original documents;
an image forming section configured to form, on the recording media of the size selected by the recording medium size selecting section, images from the image data sets of the original documents generated by the document reading section;
a large-size document identifying section configured to identify, from among the image data sets of the plurality of original documents generated by the document reading section, an image data set of large document size, the size of which is detected by the document size detecting section as being greater than an original document of a predetermined document size;
an image forming area setting section configured to, for the image data set of large document size identified by the large-size document identifying section out of the image data sets of the plurality of original documents, set an entire imagable area of one side of a recording medium of the selected size to an image forming area for image formation based on the image data set of large document size without dividing the image area into plurality of image areas and, for the image data set of the original document whose document size is the same as the predetermined document size out of the image data sets of the plurality of original documents, set one half of the imagable area of one side of a recording medium of the selected size to an image forming area for image formation based on the image data set of the predetermined document size in a layout for the booklet printing; and
a control section configured to allow the image forming section to form images from the image data sets of the original documents on the image forming areas of the recording media of the selected size set by the image forming area setting section,
wherein in case where the image data set of large document size were the image data set of which the document size is the predetermined document size, if an imagable area of the recording medium to which the image data set of large document size was supposed to be allocated has an area not large enough to form the image from the image data set of large document size the image forming area setting section is configured to not set the imagable area of the not enough size to an image forming area for any image data set of the original document, and to set an entire imagable area of one side of the recording medium on the next page to an image forming area for the image data set of large document size, and
the image forming area setting section further configured to not set an imagable area of the other side of the recording medium set the image forming area for the image data set of large document size to any image forming area for any image data set of the original document, but set an image forming area for an image data set of the original document on the next page following to the image data set of the large document size on an imagable area of the recording medium on the further next page.

2. The image forming apparatus according to claim 1, wherein the image forming area setting section sets a side of the recording medium which will be a valley side when center-folded to the image forming area for the image data set of large document size.

3. The image forming apparatus according to claim 1, wherein, for the image data set of the original document whose document size is smaller than the predetermined document size out of the image data sets of the plurality of original documents, the image forming area setting section sets one half of the imagable area of one side of a recording medium of the selected size to an image forming area in the layout for the booklet printing, and the control section enlarges the image data set of the original document whose document size is smaller than the predetermined document size to the predetermined document size and allows the image forming section to form an image from the enlarged image data set on the image forming area of the recording medium of the selected size set by the image forming area setting section.

4. An image forming method for performing booklet printing, wherein the booklet printing is a printing which reads a plurality of original documents and produces prints in which a set of images formed from the read original documents are arranged on both sides of recording medium of a size equal to two on original documents laid side by side, with four pages per recording medium, to match the page order of the original documents during reading with the page order of the resultant prints laid one on another in booklet form, the image forming method comprises:

a document reading step of reading a plurality of original documents of mixed document sizes to generate respective image data sets of the original documents;

a document size detecting step of detecting respective document sizes of the original documents to be read in the document reading step;

a recording medium size selecting step of, based on the document sizes detected in the document size detecting step, selecting a size of recording media for booklet printing and for use in forming images from the image data sets of the original documents;

a large-size document identifying step of identifying, from among the image data sets of the plurality of original documents generated in the document reading step, an image data set of an original document whose document size detected in the document size detecting step is greater than a predetermined document size;

an image forming area setting step of, for the image data set of the original document whose document size is greater than the predetermined document size, setting an entire imagable area of one side of a recording medium of the selected size to an image forming area for image formation based on the image data set of large document size without dividing the image area into plurality of image areas and, for the image data set of the original document whose document size is the same as the predetermined document size, setting one half of the imagable area of one side of a recording medium of the selected size to an image forming area for image formation based on the image data set of the predetermined document size in a layout for the booklet printing; and an image forming step of forming images from the image data sets of the original documents generated in the document reading step on the image forming areas of the recording media of the size selected in the recording medium size selecting step, the image forming areas being set in the image forming area setting step, wherein in case where the image data set of large document size were the image data set of which the document size is the predetermined document size, if an imagable area of the recording medium to which the image data set of large document size was supposed to be allocated has an area not large enough to form the image from the image data set of large document size, the image forming area setting step includes not setting the imagable area of the not enough size to an image forming area for any image data set of the original document, and setting an entire imagable area of one side of the recording medium the next page to an image forming area for the image data set of large document size, and the image forming area setting step further includes not setting an imagable area of the other side of the recording medium set the image forming area for the image data set of large document size to an image forming area for any image data set of the original document, but setting an image forming area for an image data set of the original document on the next page following to the image data set of the large document size on an imagable area of the recording medium on the further next page.

* * * * *